United States Patent
Lee et al.

(10) Patent No.: US 6,897,931 B2
(45) Date of Patent: May 24, 2005

(54) IN-PLANE SWITCHING MODE LIQUID CRYSTAL DISPLAY DEVICE AND METHOD FOR FABRICATING THE SAME

(75) Inventors: Youn Soo Lee, Ansan-shi (KR); Cheol Woo Park, Taegu-kwangyokshi (KR); Gue Tai Lee, Youngcheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/721,412

(22) Filed: Nov. 26, 2003

(65) Prior Publication Data

US 2004/0105063 A1 Jun. 3, 2004

(30) Foreign Application Priority Data

Nov. 30, 2002 (KR) .............................. 10-2002-0075609

(51) Int. Cl.[7] .......................................... G02F 1/1343
(52) U.S. Cl. .................................................. 349/141
(58) Field of Search ................................ 349/141, 143

(56) References Cited

U.S. PATENT DOCUMENTS

2004/0109122 A1 * 6/2004 Kumagawa et al. ........ 349/143

* cited by examiner

Primary Examiner—Dung T. Nguyen
(74) Attorney, Agent, or Firm—McKenna Long & Aldridge LLP

(57) ABSTRACT

An in-plane switching mode LCD device and a method for manufacturing the same is disclosed, in which the in-plane switching mode LCD device includes a substrate; a plurality of common electrodes at fixed intervals in one direction on the substrate; an insulating layer on the substrate including the plurality of common electrodes; a plurality of pixel electrodes at fixed intervals on the insulating layer between the respective plurality of common electrodes; and a dummy common electrode on the insulating layer at one side of one of the pixel electrodes, wherein the dummy common electrode is electrically connected to an outermost common electrode among the plurality of common electrodes.

12 Claims, 4 Drawing Sheets

IN-PLANE SWITCHING MODE LIQUID CRYSTAL DISPLAY DEVICE AND METHOD FOR FABRICATING THE SAME

This application claims the benefit of the Korean Application No. P2002-75609 filed on Nov. 30, 2002, which is hereby incorporated by reference.

BACKGROUND OF THE INVENTION

1. Field of the Invention

The present invention relates to a liquid crystal display (LCD) device, and more particularly, to an in-plane switching mode LCD device and a method for manufacturing for decreasing failures by D.C. substances in forming a dummy common electrode at the same layer as a pixel electrode.

2. Discussion of the Related Art

Demands for various display devices have increased with development of information society. Accordingly, many efforts have been made to research and develop various flat display devices such as liquid crystal display (LCD), plasma display panel (PDP), electroluminescent display (ELD), and vacuum fluorescent display (VFD). Some species of the flat display devices have already been applied to displays of various equipments.

Among the various flat display devices, the liquid crystal display (LCD) device has been most widely used due to advantageous characteristics of thinness, low weight, and low power consumption, whereby the LCD device substitutes for a Cathode Ray Tube (CRT). In addition to mobile type LCD devices such as a display for a notebook computer, LCD devices have been developed for computer monitors and televisions in order to receive and display broadcasting signals.

Despite various technical developments in LCD technology with applications in different fields, research in enhancing the picture quality of the LCD as a display has been, in some respect, lacking as compared to other features and advantages of the LCD device. Therefore, to use the LCD device in various fields as a general display, the key to developing the LCD device relies on whether the LCD device can implement a high quality picture, such as high resolution and high luminance with a large-sized screen while still maintaining lightweight, thin profile, and low power consumption.

The LCD device is provided with an LCD panel for displaying a picture, and a driving part for applying a driving signal to the LCD panel. The LCD panel has first and second glass substrates bonded together with a gap between the substrates. A liquid crystal layer is formed by injecting liquid crystal between the first and second glass substrates. On the first glass substrate (a thin film transistor array substrate), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines arranged in a matrix, and a plurality of thin film transistors (TFTs) that are switchable in response to a signal on the gate lines for transmission of a signal on the data line to the pixel electrodes. Also, the second glass substrate (a color filter substrate) has a black matrix layer for shielding light from areas excluding the pixel regions, a R/G/B color filter layer, and a common electrode for implementing a picture image. A predetermined interval is maintained between the first and second substrates by spacers, and the first and second substrates are bonded to each other by a sealant having an injection inlet. Liquid crystal is injected between the first and second substrates.

In the aforementioned LCD device, liquid crystal molecules are driven according to an electric field vertically generated at lower and upper sides between the common electrode and the pixel electrode. The LCD device has great transmissivity and high aperture ratio. Also, the common electrode of the second substrate serves as a ground, whereby it is possible to prevent liquid crystal cells from being damaged by static electricity. In order to solve problems such as these, an in-plane switching mode LCD device is proposed. In the in-plane switching mode LCD device, an arrangement of liquid crystal molecules is controlled by an electric field that is parallel to the substrates. In this case, when a voltage is applied to the common and pixel electrodes formed on the same substrate, the liquid crystal molecules are arranged by the electric field in parallel to the substrates between the common and pixel electrodes. As a result, the liquid crystal molecules of the liquid crystal layer are rotated to a state of being in parallel to the substrate according to the electric field, thereby controlling light transmittance of the liquid crystal layer.

Accordingly, the common and pixel electrodes are formed at a fixed interval on the thin film transistor array substrate in the in-plane switching mode LCD device. That is, the liquid crystal molecules are controlled by the electric field formed in parallel to the substrates between the common and pixel electrodes formed on the thin film transistor array substrate. In a case, in which the voltage is not applied to the common and pixel electrodes (turn-off state), the liquid crystal molecules are arranged in parallel to the common and pixel electrodes. If a voltage is applied to the common and pixel electrodes (turn-on state), the liquid crystal molecules are arranged at the same direction as the electric field to be in parallel to the substrates. Thus, the liquid crystal molecules are controlled by an alignment layer, and the light transmittance is controlled by the electric field being parallel to the substrates when applying the external driving voltage to the common and pixel electrodes. As a result, it is possible to obtain a wide viewing angle (about 70° in the left and right sides), and to decrease color changes.

Hereinafter, an in-plane switching mode LCD device according to the related art will be described with reference to the accompanying drawings.

FIG. 1 is a plan view illustrating an outermost pixel of an in-plane switching mode LCD device according to the related art. As shown in FIG. 1, the in-plane switching mode LCD device according to the related art includes a plurality of gate lines 11, a plurality of data lines 12, a plurality of thin film transistors 16, a plurality of common lines 13, a plurality of common electrodes 15, and a plurality of pixel electrodes 14. At this time, the plurality of gate lines 11 respectively having gate electrodes 17 are formed at fixed intervals in one direction on a substrate, and the plurality of data lines 12 are formed perpendicular to the gate lines 11, thereby defining a plurality of pixel regions. The plurality of thin film transistors 16 are formed at respective crossing points of the gate and data lines 11 and 12, and each common line 13 is formed on the same layer as the gate line 11 in parallel to the gate line 11. Also, the plurality of common electrodes 15 are formed on the same layer as the common lines 13 in the respective pixel regions, in parallel to the data lines 12. At this time, the common electrodes 15 are formed of the same material as the common lines 13. The plurality of pixel electrodes 14 are formed in the respective pixel regions at fixed intervals from the respective common electrodes 15, wherein the pixel electrodes 14 are connected to drain electrodes 19 of the thin film transistors 16.

Each thin film transistor 16 includes the gate electrode 17, an active layer 20, and source and drain electrodes 18 and 19. The gate electrode 17 is extended from the gate line 11, and a gate insulating layer is formed on an entire surface of the substrate including the gate electrode 17. Then, the active layer 20 is formed on the gate insulating layer and corresponds to the gate electrode 17. The source electrode 18 is extended from the data line 12, and the drain electrode 19 is connected to the pixel electrode 14. In the pixel region, the pixel electrode 14 and the common electrode 15 are formed in parallel to the data line, and the pixel electrode 14 is partially overlapped with the common line 13 and the common electrode 15 to improve capacity.

A method for manufacturing the in-plane switching mode LCD device according to the related art will be described as follows.

FIG. 2 is a cross-sectional view taken along line I–I' of FIG. 1. Referring to FIG. 2, a gate metal material is deposited on the substrate 21, and then patterned by photolithography, thereby forming the gate line 11 having the gate electrode 17, and the common line 13 having the common electrode 15, simultaneously. Then, the gate insulating layer 22, the active layer (20 of FIG. 1), and an ohmic contact layer (not shown) are sequentially deposited on an entire surface of the substrate including the gate line 11, the gate electrode 17, the common line 13 and the common electrode 15, and then patterned by photolithography, thereby forming the active layer 20 of the thin film transistor.

Subsequently, a metal material for the source and drain electrodes is deposited on the gate insulating layer 22 including the active layer of the thin film transistor 16, and then the metal material is selectively removed by photolithography, thereby forming the data line 12, the source electrode 18 and the drain electrode 19. Then, a passivation layer is formed on the entire surface of the substrate, and the passivation layer 23 on the drain electrode 19 is selectively removed, thereby forming a contact hole. After that, the pixel electrode 14 is formed in the pixel region for being electrically connected to the drain electrode 19. Also, a transparent conductive material is deposited on the passivation layer 23, and then patterned by photolithography.

In the in-plane switching mode LCD device according to the related art, when applying a voltage to the common electrode 15 and the pixel electrode 14, the electric field is generated between the common electrode 15 and the pixel electrode 14 on the passivation layer 23 in parallel to the substrates. At this time, the pixel region is divided into four regions according to the electric field in parallel to the substrates. FIG. 2 illustrates the four regions of the outermost pixel region according to the electric field in parallel to the substrates. It is necessary to form an equipotential in regions A and D, and regions B and C of the common and pixel electrodes 15 and 14 to prevent failures by D.C. substances. In each of the pixel regions except the outermost pixel region, the region D is next to the region A of an adjoining pixel region; thus, forming a structural symmetry of regions A and D. As such, it is possible to form the equipotential in the region A and the region D. However, in the outermost pixel region, another pixel region is not formed next to the region (D). Thus a structural symmetry is not formed in the region (A) and the region (D). As such, an equipotential is not formed in the region (A) and the region (D) of the outermost pixel region, so that D.C. substances are accumulated in the outermost common electrode 15 of the region (D). The D.C. substances are not discharged quickly. At this time, the common electrode 15 in the region (D) is marked to the outermost common electrode 15.

SUMMARY OF THE INVENTION

Accordingly, the present invention is directed to an in-plane switching mode LCD device and a method for manufacturing the same that substantially obviates one or more problems due to limitations and disadvantages of the related art.

An advantage of the present is to provide an in-plane switching mode LCD device and a method for manufacturing the same, in which a dummy common electrode is formed in an outermost pixel region on the same layer as a pixel electrode, for being electrically connected to a common electrode, so that it is possible to discharge remaining D.C. substances accumulated in an outermost common electrode quickly, thereby preventing an afterimage.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an in-plane switching mode LCD device includes a substrate; a plurality of common electrodes at fixed intervals in one direction on the substrate; an insulating layer on the substrate including the common electrodes; a plurality of pixel electrodes at fixed intervals on the insulating layer between the respective common electrodes; and a dummy common electrode on the insulating layer at one side of the pixel electrode, wherein the dummy common electrode is electrically connected to the outermost common electrode among the common electrodes.

In another aspect, an in-plane switching mode LCD device includes a substrate; gate and common electrodes on the substrate; a gate insulating layer on an entire surface of the substrate; a semiconductor layer on the gate insulating layer above the gate electrode; a data line having source and drain electrodes above both sides of the semiconductor layer; a passivation layer on the entire surface of the substrate including the data line; a pixel electrode on the passivation layer, wherein the pixel electrode is connected to the drain electrode; and a dummy common electrode on the passivation layer at one side of the pixel electrode and connected to the common electrode.

A method for manufacturing an in-plane switching mode LCD device includes forming a gate line having a gate electrode, and a common line having a common electrode on a substrate; forming a gate insulating layer on an entire surface of the substrate; forming a data line on the gate insulating layer, wherein the data line is perpendicular to the gate line, the data line having source and drain electrodes; forming a passivation layer on the entire surface of the substrate; forming a pixel electrode on the passivation layer, wherein the pixel electrode is connected to the drain electrode; and forming a dummy common electrode for being connected to the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
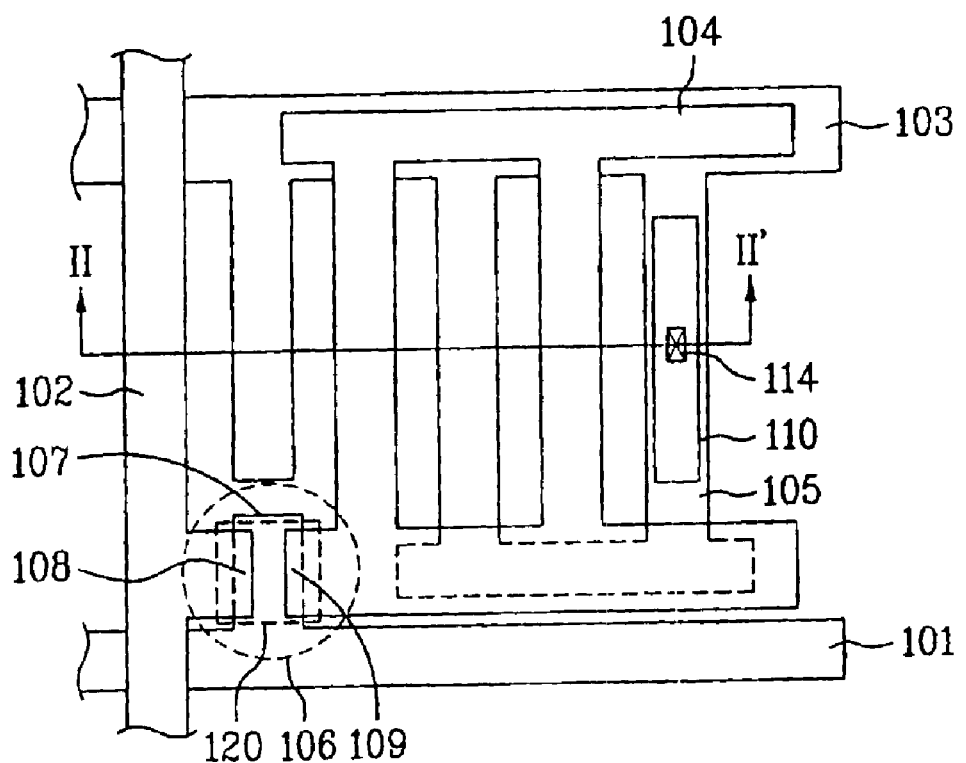
FIG. 3 is a plan view illustrating an outermost pixel region of an in-plane switching mode LCD device according to the present invention.

FIG. 3 is a plan view illustrating an outermost pixel region of an in-plane switching mode LCD device according to the preferred embodiment of the present invention. As shown in FIG. 3, the in-plane switching mode LCD device according to the present invention includes a gate line 101, a data line 102, a thin film transistor 106, a common line 103, a plurality of common electrodes 105, a plurality of pixel electrodes 104, and a dummy common electrode 110. The gate line 101 is formed at a fixed interval in one direction on a substrate, and the data line 102 is formed at a fixed interval perpendicular to the gate line 101, thereby forming a pixel region. The thin film transistor 106 is formed at a crossing point of the gate and data lines 101 and 102, and the common line 103 is formed on the same surface as the gate line 101 in parallel to the gate line 101. Also, the plurality of common electrodes 105 are formed in the pixel region on the same surface as the common line 103 in parallel to the data line 102. The common electrodes are formed of the same material as the common line 103. The plurality of pixel electrodes 104 are formed in the respective pixel regions at fixed intervals from the common electrodes 105, for being connected to respective drain electrodes 109 of the thin film transistors 106. The dummy common electrode 110 is formed on the same surface as the pixel electrode 104 and is electrically connected to the common electrode by being overlapped with the outermost common electrode 105 among the plurality of common electrodes 105.

The thin film transistor 106 includes a gate electrode 107 projecting from the gate line 101, a source electrode 108 projecting from the data line 102 and being partially overlapped with the gate electrode 107, and the drain electrode 109 being partially overlapped with the gate electrode 107 at a fixed interval from the source electrode 108. The dummy common electrode 110 is formed in the outermost pixel region of the substrate, and the dummy common electrode 110 is formed on the same layer as the pixel electrode 104, for being electrically connected with the outermost common electrode 105.

A method for manufacturing the in-plane switching mode LCD device having the aforementioned structure will be described as follows. FIG. 4A to FIG. 4D are cross-sectional views illustrating manufacturing process steps of the In-Plane switching mode LCD device according to the present invention taken along line II–II' of FIG. 3.

Figure 4A:
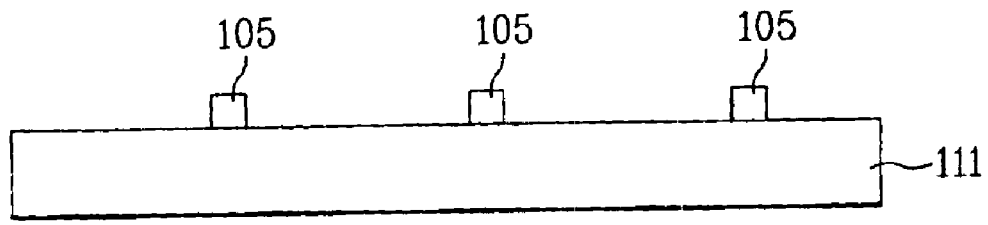
FIG. 4A to FIG. 4D are cross-sectional views illustrating manufacturing process steps according to a line II–II' of FIG. 3.

As shown in FIG. 4A, a gate metal material is deposited on the substrate 111 by sputtering, and then the gate metal material is selectively removed by photolithography, thereby forming the gate line 101 (not shown) having a gate electrode 107, and the common line 103 (not shown) having the plurality of common electrodes 105, simultaneously.

Figure 4B:
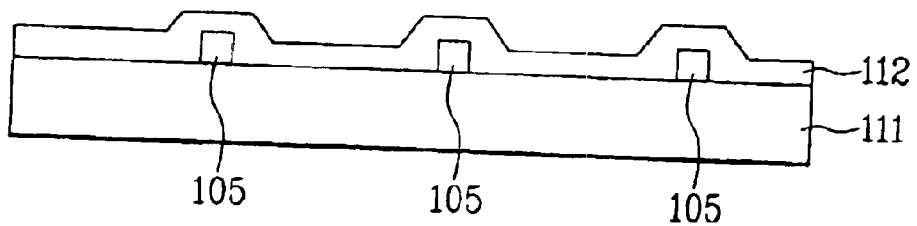

Referring to FIG. 4B, a gate insulating layer 112, an active layer 120 and an ohmic contact layer (not shown) are sequentially deposited on an entire surface of the substrate 111 including the gate line 101, the gate electrode 107, the common line 103 and the common electrode 105. Then, the active layer 120 and the ohmic contact layer are selectively removed by photolithography, thereby forming the active layer 120 of the thin film transistor 106.

Figure 4C:
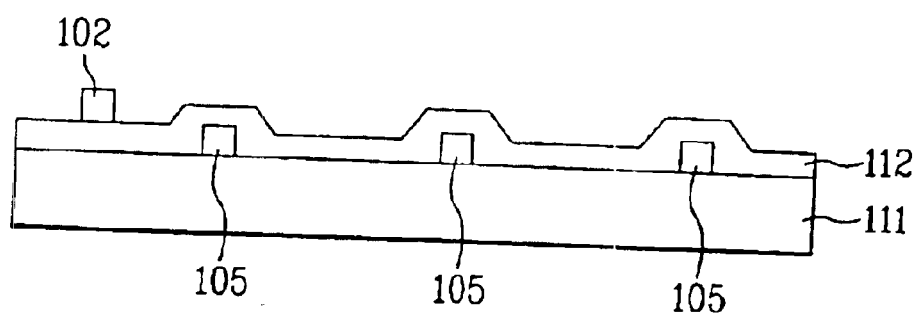

As shown in FIG. 4C, a metal material for forming source and drain electrodes is deposited on the entire surface of the substrate 111 by sputtering, and then the metal material is selectively removed by photolithography, thereby forming the source and drain electrodes 108 and 109 in the data line 102 and a predetermined portion.

Figure 4D:
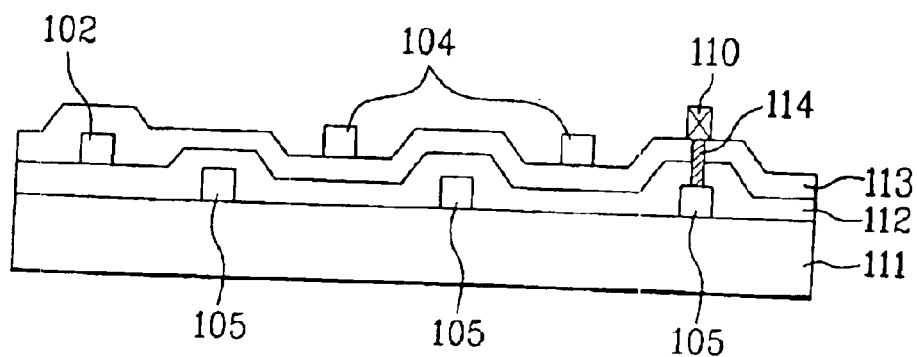

Referring to FIG. 4D, a passivation layer 113 is formed on the entire surface of the substrate including the data line 102. Then, the passivation layer on a predetermined portion of the drain electrode 109 is selectively removed to form a first contact hole (not shown), and the passivation layer 113 and the gate insulating layer 112 are selectively removed by photolithography to expose a predetermined portion of the outermost common electrode 105 inside the outermost pixel region, thereby forming a second contact hole 114. Subsequently, a transparent material is deposited for being electrically connected to the drain electrode 109 through the first contact hole and the outermost common electrode 105 in the outermost pixel region through the second contact hole 114. Then, the transparent material is selectively removed, thereby forming the pixel electrode 104 and the dummy common electrode 110. At this time, the pixel electrode 104 is connected to the drain electrode 109 through the first contact hole, and the dummy common electrode 110 is electrically connected to the outermost common electrode 105 through the second contact hole 114.

In the in-plane switching mode LCD device according to the present invention, the outermost common electrode 105 in the gate insulating layer 112 of the outermost pixel region is overlapped with the dummy common electrode 110 on the passivation layer 113 and electrically connected to each other, whereby it has the effect of forming the pixel electrode 104 and the common electrode 105 on the same layer.

Figure 1:
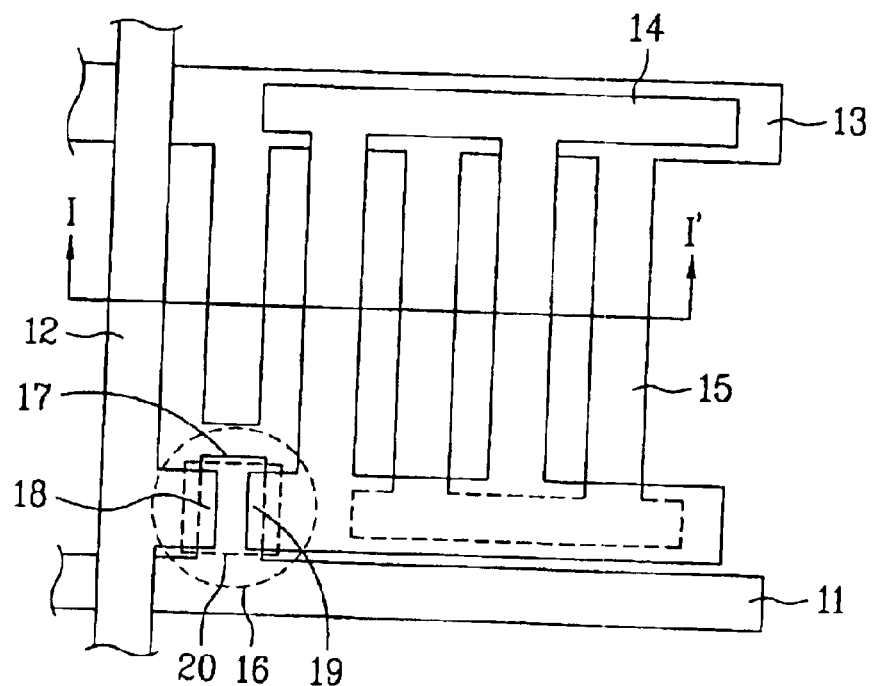
FIG. 1 is a plan view illustrating an outermost pixel region of an in-plane switching mode LCD device according to the related art.
Figure 2:
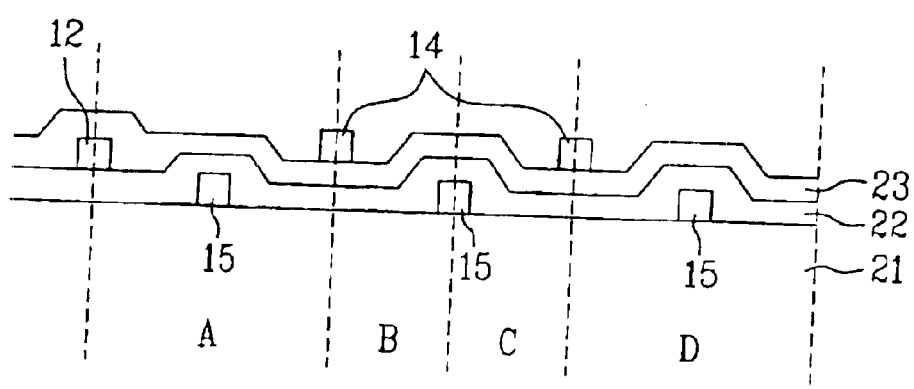
FIG. 2 is a cross-sectional view illustrating a structure forming a pixel electrode at a different layer from a common electrode according a line I–I' of FIG. 1.
Figure 5:
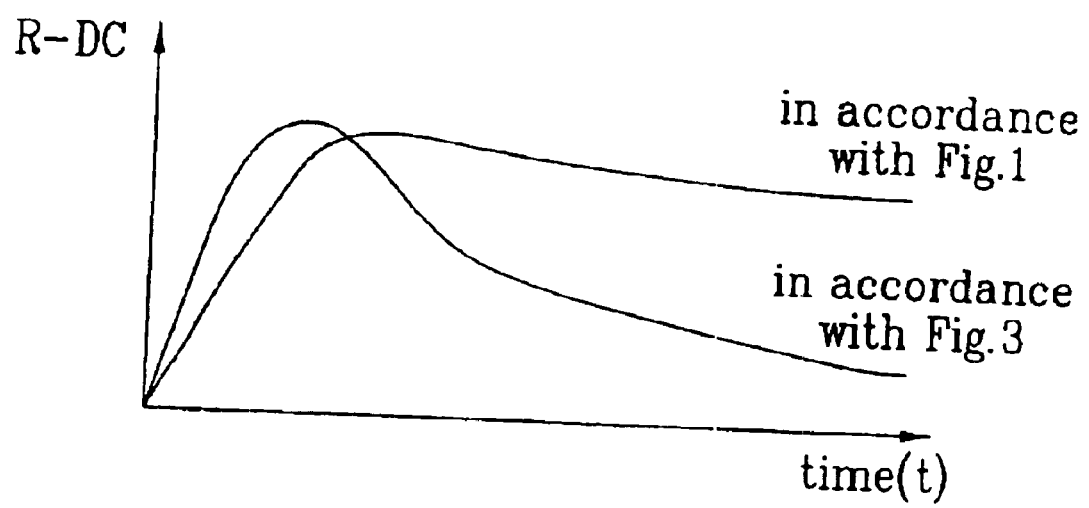
FIG. 5 is a graph illustrating a structure having a pixel electrode at the same layer as a common electrode as compared with a structure having a pixel electrode at a different layer from a common electrode.

FIG. 5 illustrates characteristics of the in-plane switching mode LCD device according to the structure forming the pixel electrode 104 and the dummy common electrode 110. In particular, FIG. 5 illustrates a graph of the remaining D.C. substances of the structure forming the pixel electrode 104 and the common electrode 105 on the same layer as in the present invention, and the structure of forming the pixel electrode 104 at the different layer from the common electrode 105, as discussed in related art FIG. 2.

As shown in FIG. 5, in a structure forming the pixel electrode 104 and the common electrode 105 on the same layer, D.C. substances (remaining D.C.) are quickly discharged in comparison with a structure forming the pixel electrode 104 at the different layer from the common electrode 105. That is, in the related art in-plane switching mode LCD device forming the pixel electrode 104 at the different layer from the common electrode 105, it is hard to maintain structural symmetry in the outermost pixel region, whereby remaining electric charges accumulate in the outermost common electrode 105. Thus, after a picture image is changed, an afterimage remains on a screen. However, in the in-plane switching mode LCD device according to the present invention, the dummy common electrode 110 is formed on the same layer as the pixel electrode 104 in the outermost pixel region, so that it is possible to prevent the afterimage by quickly discharging the remaining D.C. substances through the dummy common electrode 110.

As mentioned above, the in-plane switching mode LCD device and the method for manufacturing the same have the following advantages.

In the in-plane switching mode LCD device according to the present invention, the dummy common electrode is formed on the same layer as the pixel electrode in the outermost pixel region, whereby the outermost common electrode in the gate insulating layer is electrically connected to the dummy common electrode on the passivation layer through the second contact hole. As a result, there is an effect of forming the pixel electrode on the same layer as the common electrode by the dummy common electrode. Accordingly, it is possible to prevent an afterimage by quickly discharging the remaining D.C. substances accumulated in the outermost common electrode.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching mode LCD device, comprising:
   a substrate;
   a plurality of common electrodes at fixed intervals in one direction on the substrate;
   an insulating layer on the substrate including the plurality of common electrodes;
   a plurality of pixel electrodes at fixed intervals on the insulating layer between the plurality of common electrodes; and
   a dummy common electrode on the insulating layer at one side of the plurality of pixel electrodes, the dummy common electrode electrically connected to an outermost common electrode among the plurality of common electrodes.

2. The in-plane switching mode LCD device of claim 1, wherein the plurality of pixel electrodes are formed of the same material as the dummy common electrode.

3. The in-plane switching mode LCD device of claim 1, wherein the insulating layer includes a gate insulating layer and a passivation layer.

4. The in-plane switching mode LCD device of claim 3, further comprising a plurality of data lines on the gate insulating layer substantially perpendicular to gate lines on the substrate.

5. The in-plane switching mode LCD device of claim 1, further comprising:
   thin film transistors at crossing points of data and gate lines; and
   a common line on a same surface as the gate lines, the common line formed of the same material as the plurality of common electrodes.

6. An in-plane switching mode LCD device, comprising:
   a substrate;
   gate and common electrodes on the substrate;
   a gate insulating layer on the substrate;
   a semiconductor layer on the gate insulating layer above the gate electrode;
   a data line having source and drain electrodes above both sides of the semiconductor layer;
   a passivation layer on the substrate including the data line;
   a pixel electrode on the passivation layer, the pixel electrode connected to the drain electrode via a first contact hole; and
   a dummy common electrode on the passivation layer at one side of the pixel electrode, the dummy common electrode connected to the common electrode via a second contact hole.

7. The in-plane switching mode LCD device of claim 6, wherein the pixel electrode is formed of the same material as the dummy common electrode.

8. A method for manufacturing an in-plane switching mode LCD device, comprising:
   forming a gate line having a gate electrode and a common line having a common electrode on a substrate;
   forming a gate insulating layer on the substrate;
   forming a data line on the gate insulating layer substantially perpendicular to the gate line, the data line having source and drain electrodes;
   forming a passivation layer on the substrate including the data line;
   forming a pixel electrode on the passivation layer, the pixel electrode connected to the drain electrode; and
   forming a dummy common electrode on the passivation layer, the dummy common electrode connected to an outermost common electrode.

9. The method of claim 8, further comprising sequentially forming an active layer and an ohmic layer on the substrate after forming the gate insulating layer.

10. The method of claim 9, wherein the active layer and ohmic layer are selectively removed.

11. The method of claim 8, wherein further comprising forming a contact hole in the passivation layer over the outermost common electrode.

12. The method of claim 8, wherein the pixel electrode is formed of the same material as the dummy common electrode.

* * * * *